US010379623B2

(12) United States Patent
DeLuca et al.

(10) Patent No.: US 10,379,623 B2
(45) Date of Patent: *Aug. 13, 2019

(54) WEARABLE DEVICE POSITIONING BASED CONTROL

(71) Applicant: INTERNATIONAL BUSINESS MACHINES CORPORATION, Armonk, NY (US)

(72) Inventors: Lisa Seacat DeLuca, Baltimore, MD (US); Clifford A. Pickover, Yorktown Heights, NY (US); Dana L. Price, Durham, NC (US); Aaron J. Quirk, Research Triangle Pa, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/243,239

(22) Filed: Jan. 9, 2019

(65) Prior Publication Data

US 2019/0146591 A1 May 16, 2019

Related U.S. Application Data

(63) Continuation of application No. 15/967,810, filed on May 1, 2018, which is a continuation of application
(Continued)

(51) Int. Cl.
*G06F 3/01* (2006.01)
*G08C 17/02* (2006.01)
*G06F 3/0346* (2013.01)

(52) U.S. Cl.
CPC ............ *G06F 3/017* (2013.01); *G06F 3/0346* (2013.01); *G08C 17/02* (2013.01); *G08C 2201/32* (2013.01); *G08C 2201/93* (2013.01)

(58) Field of Classification Search
CPC ...... G06F 3/017; G08C 17/02; G08C 2201/32
(Continued)

(56) References Cited

U.S. PATENT DOCUMENTS 8,768,648 B2 7/2014 Panther
8,976,965 B2 3/2015 Aminzade
(Continued)

FOREIGN PATENT DOCUMENTS

WO 2015031426 A1 3/2015

OTHER PUBLICATIONS

Friedman, Mark J.; List of IBM Patents or Patent Applications Treated as Related; Jan. 9, 2019; 1 page.
(Continued)

*Primary Examiner* — Steven Lim
*Assistant Examiner* — Mancil Littlejohn, Jr.
(74) *Attorney, Agent, or Firm* — Schmeiser, Olsen & Watts; Michael A. Petrocelli

(57) ABSTRACT

A method and system for positioning based device control. The method includes receiving device control instructions associated with function control of a device based on a positioning of a wearable hardware device of a user. Communications between the device and the wearable hardware device are synchronized and a position signal indicating a current position of the wearable hardware device with respect to a body of the user is received. In response, a command associated with controlling a specified function of the device is received and a command is executed resulting in the specified function of the device being modified.

20 Claims, 4 Drawing Sheets

Related U.S. Application Data

No. 15/177,675, filed on Jun. 9, 2016, now Pat. No. 9,996,163.

(58) Field of Classification Search
USPC .......................................................... 340/12.5
See application file for complete search history.

(56) References Cited

U.S. PATENT DOCUMENTS

| | | |
|---|---|---|
| 8,992,324 B2 | 3/2015 | Guild |
| 9,288,836 B1 | 3/2016 | Clement |
| 2015/0054630 A1 | 2/2015 | Xu |
| 2015/0249976 A1 | 9/2015 | Melzer |
| 2015/0277557 A1 | 10/2015 | Raffa |
| 2015/0301606 A1 | 10/2015 | Andrei |
| 2015/0378330 A1 | 12/2015 | Xi |
| 2017/0357326 A1 | 12/2017 | DeLuca |

OTHER PUBLICATIONS

Mayton, Brian D. et al., WristQue: A Personal Sensor Wristband; 2013 IEEE International Conference on Body Sensor Networks; May 6-9, 2013; pp. 1-6.

Xiao, Robert et al.; Expanding the Input Expressivity of Smartwatches with Mechanical Pan Twist, Tilt and Click; CHI 14 Proceedings of the SIGCHI Conference on Human Factors in Computing Systems; Apr. 26-May 1, 2014; pp. 193-196.

WEARABLE DEVICE POSITIONING BASED CONTROL

CROSS REFERENCE TO RELATED APPLICATIONS

This application is a continuation application claiming priority to Ser. No. 15/967,810 filed May 1, 2018 which is a continuation application claiming priority to Ser. No. 15/177,675 filed Jun. 9, 2016 now U.S. Pat. No. 9,996,163 issued Jun. 12, 2018, the contents of which are hereby incorporated by reference.

FIELD

The present invention relates generally to a method for enabling position based control and in particular to a method and associated system for improving communications technology by modifying control of a device based on a positioning of an additional device of a user.

BACKGROUND

Modifying functionality of an apparatus typically includes an inaccurate process with little flexibility. Coordinating multiple apparatus communication based control typically involves an unreliable process. Associating gestures with products may include a complicated process that may be time consuming and require a large amount of resources. Accordingly, there exists a need in the art to overcome at least some of the deficiencies and limitations described herein above.

SUMMARY

A first aspect of the invention provides a positioning based control method comprising: receiving, by a processor of a device of a user, device control instructions associated with function control of the device based on a positioning of a wearable hardware device of the user; synchronizing, by the processor, communications between the device and the wearable hardware device; receiving, by the processor from the wearable hardware device, a position signal indicating a current position of the wearable hardware device with respect to a body of the user; determining, by the processor based on the position signal, a command associated with controlling a specified function of the device; and executing, by the processor, the command resulting in the specified function of the device being modified.

A second aspect of the invention provides a positioning based control method comprising: receiving, by a processor of a wearable device of a user, device control instructions associated with function control of the wearable device based on a positioning of the wearable hardware device of the user; receiving, by the processor from a sensor of the wearable hardware device, a position signal indicating a current position of the wearable hardware device with respect to a body of the user; determining, by the processor based on the position signal, a command associated with controlling a specified function of the wearable device; and executing, by the processor, the command resulting in the specified function of the wearable device being modified.

A third aspect of the invention provides a computer program product, comprising a computer readable hardware storage device storing a computer readable program code, the computer readable program code comprising an algorithm that when executed by a processor of a device of a user implements a positioning based control method, the method comprising: receiving, by the processor, device control instructions associated with function control of the device based on a positioning of a wearable hardware device of the user; synchronizing, by the processor, communications between the device and the wearable hardware device; receiving, by the processor from the wearable hardware device, a position signal indicating a current position of the wearable hardware device with respect to a body of the user; determining, by the processor based on the position signal, a command associated with controlling a specified function of the device; and executing, by the processor, the command resulting in the specified function of the device being modified.

The present invention advantageously provides a simple method and associated system capable of modifying functionality of an apparatus.

DETAILED DESCRIPTION

Figure 1:
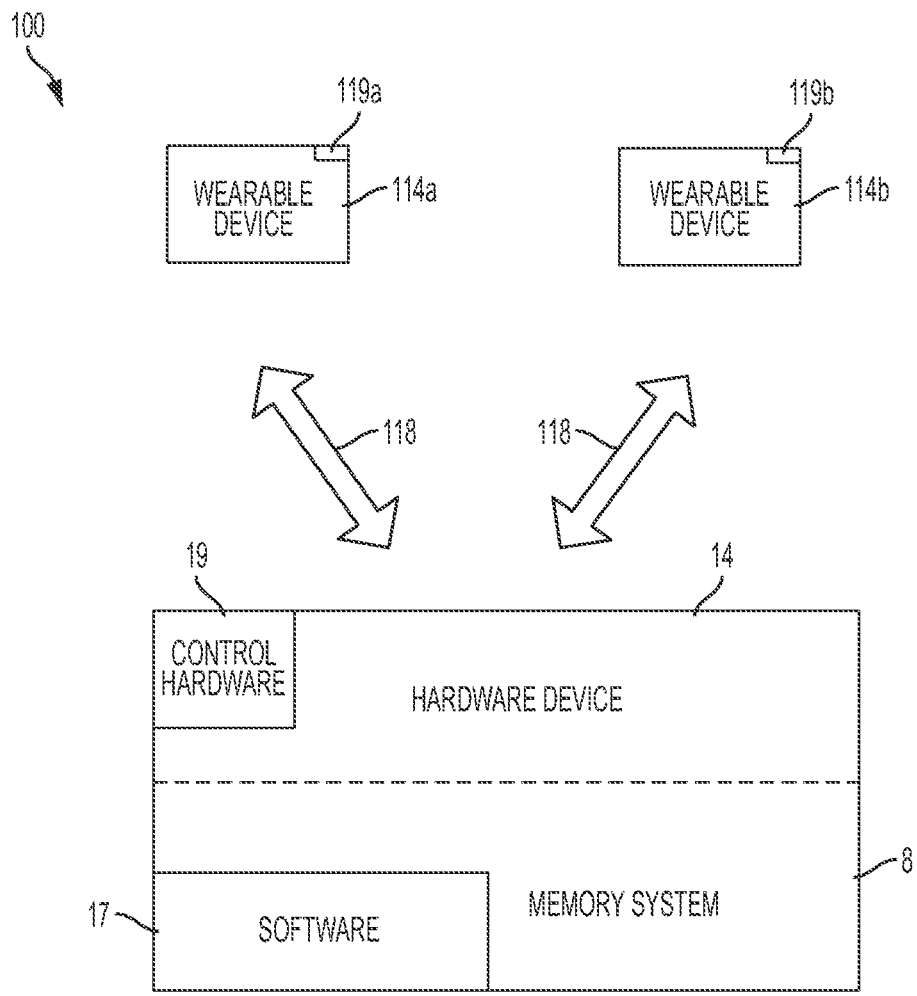
FIG. 1 illustrates a system for modifying functional control of a hardware device based on a positioning of a wearable device(s) of a user, in accordance with embodiments of the present invention.

FIG. 1 illustrates a system 100 for modifying functional control of a hardware device 14 based on a positioning of a wearable device 114a and/or a wearable device 114b of a user, in accordance with embodiments of the present invention. System 100 enables an improvement to a process for modifying functional control of hardware device 14 by enabling gestures of a wearable device (e.g., wearable devices 119a and/or 119b). For example, a display portion of a wearable device may be rotated with respect to a body portion (e.g., a wrist, a forearm, etc.) of a user to issue a command for increasing an audio level of hardware device 14. A band (securing the wearable device to a user) comprising the display portion of the wearable device may be rotated a specified number of degrees (e.g., 90 degrees, 180 degrees, etc.) in a specified direction (e.g., clockwise or counterclockwise) around the axis of a forearm such that that the display portion is facing towards or away from a user's face. The aforementioned process may be enabled to control a functionality of hardware device 14 (e.g., communications, an audio volume level, etc.). Alternatively, the wearable device may comprise an interface including switches (mechanical or virtual) for controlling a functionality of hardware device 14. Additionally, the aforementioned process may be enabled to control a functionality of wearable device 114a and/or a wearable device 114b (e.g., communications, an audio volume level, backlight control, etc.)

System 100 of FIG. 1 includes hardware device 14 communicatively connected to wearable devices 114a and 114b via a wireless network 118. Wearable devices 114a and 114b may comprise any type of mobile hardware wearable communication device including, inter alia, a smart watch, a mobile phone, a PDA, a specialized hardware device, etc. Hardware device 14 may comprise any type of mobile communication device including, inter alia, a mobile phone, a PDA, a specialized hardware device, etc. Wearable devices 114a and 114b (i.e., control hardware 119a and 119b internal to wearable devices 114a and 114b) and hardware device 14 each may comprise an embedded computer. An embedded computer is defined herein as a remotely portable dedicated computer comprising a combination of computer hardware and software (fixed in capability or programmable) specifically designed for executing a specialized function. Programmable embedded computers may comprise specialized programming interfaces. Additionally, wearable devices 114a and 114b (i.e., control hardware 119a and 119b internal to wearable devices 114a and 114b) and hardware device 14 may each comprise a specialized hardware device comprising specialized (non-generic) hardware and circuitry (i.e., specialized discrete non-generic analog, digital, and logic based circuitry) for executing a process described with respect to FIGS. 1-3. The specialized discrete non-generic analog, digital, and logic based circuitry may include proprietary specially designed components (e.g., a specialized integrated circuit designed for only implementing an automated process for modifying functional control of hardware device 14 based on a positioning of wearable device 114a and/or wearable device 114b). Hardware device 14 includes a memory system 8, software 17, and control hardware 19 (i.e., all sensors and associated control hardware for enabling software 17 to execute a process modifying functional control of a hardware device based on a positioning of a wearable device). The memory system 8 may include a single memory system. Alternatively, the memory system may include a plurality of memory systems. Control hardware 19 may include sensors for detecting wearable devices 114a and 114b. Additionally, wearable devices 114a and 114b may include sensors for detecting rotation and specified movements of wearable devices 114a and 114b. Sensors may include, inter alia, GPS sensors, video recording devices, optical sensors, weight sensors, RFID sensors, Bluetooth sensors, NFC sensors, an accelerometer, a humidity sensor, a pressure sensor, a proximity sensor, a temperature sensor, a heart rate monitor, a motion sensor, etc.

The following example describes an implementation process for modifying functional control of a hardware device 14 based on a positioning of a wearable device:

The process is initiated via a software application (on a hardware device) enabled to utilize wearable rotation gestures (e.g., rotating a display portion of a wearable device with respect to a forearm of a user) to modify policies of and/or issue control commands for a hardware device. The software application includes logic for indicating actions associated with the following example wearable device rotation actions (with respect to an axis of a wrist or forearm): a 90 degree rotation, a 180 degree rotation, a 270 degree rotation, a 360 degree rotation, a counter clockwise rotation, a clockwise rotation, a specified rotation pattern (e.g., counterclockwise 90 degrees followed by clockwise 180 degrees), or any combination thereof. The wearable device is synchronized with the hardware device. Optionally, a user may set an initial starting preference such as a display portion being located face up (i.e., 0 degrees) or face down (180 degrees) with respect to a forearm of the user. In response to a specified rotation (of the wearable device), the hardware device receives a position signal from the wearable device via position sensors of the wearable device (e.g., sensors 119a and/or 119b). The position signal indicates a position of the wearable device (with respect to the user) and enables an associated action or policy change for the hardware device. Additional wearable device rotation gestures are continuously monitored and associated actions or policy changes for the hardware device are enabled. Additionally, multiple wearable devices may be used in combination to issue associated actions or policy changes for the hardware device. For example, a first wearable device of a user may be rotated 90 degrees and a second wearable device of the user may be rotated 180 degrees resulting in a command being issued (for associated actions or policy changes) via both rotation processes.

Figure 2A:
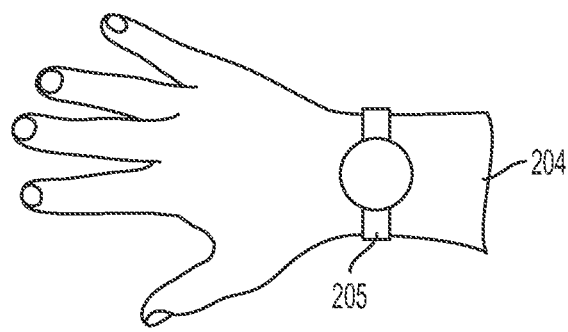
FIGS. 2A-2C, in combination, illustrate a rotation implementation scenario enabled by the system of FIG. 1, in accordance with embodiments of the present invention.
Figure 2B:
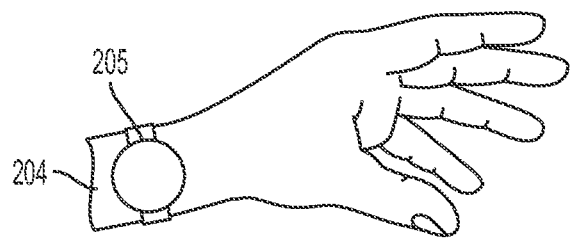
Figure 2C:
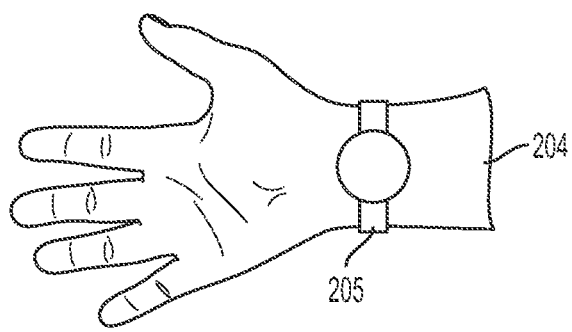

FIGS. 2A-2C, in combination, illustrate a rotation implementation scenario enabled by system 100 of FIG. 1, in accordance with embodiments of the present invention. FIG. 2A illustrates a user wearing a wearable device 205 (in an initial position) on a body portion (i.e., a wrist). Upon a command from the user, the wearable device 205 is paired (i.e., synchronized) with his/her mobile phone (e.g., a smart phone). The user is a salesman and meets with clients for presentations throughout the day. During the presentations, the user wishes to avoid distractions by his/her mobile device presenting incoming notifications. Therefore (prior to a presentation), the user rotates the wearable device 205 90 degrees clockwise (as illustrated in FIG. 2B) to initialize the mobile device for vibration functionality thereby disabling mobile phone audible distractions. During the presentation, the mobile device recognizes the gesture (i.e., the 90 degree rotation) and places itself on vibrate. As the presentation progresses, the user determines that the vibrations (from the mobile device) are becoming distracting. Therefore, the user rotates the wearable device 205 another 90 degrees clockwise as illustrated in FIG. 2C. The additional rotation of wearable device 205 issues a command for disabling the vibration functionality (as well as the audible notifications) for the mobile device. Upon termination of the presentation, the user rotates the wearable device back to an initial position (i.e., 180 degrees counterclockwise) to enable audible notifications.

Figure 3:
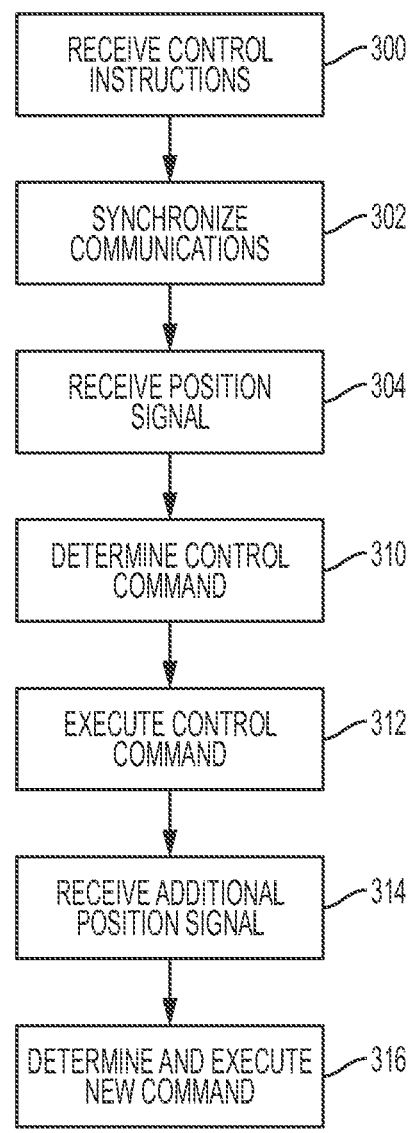
FIG. 3 illustrates an algorithm detailing a process flow enabled by the system of FIG. 1 for modifying functional control of a hardware device based on a positioning of a wearable device(s) of a user, in accordance with embodiments of the present invention.

FIG. 3 illustrates an algorithm detailing a process flow enabled by system 100 of FIG. 1 for modifying functional control of a hardware device based on a positioning of a wearable device(s) of a user, in accordance with embodiments of the present invention. Each of the steps in the algorithm of FIG. 3 may be enabled and executed in any order by a computer processor(s) or any type of specialize d hardware executing computer code. In step 300, device control instructions (associated with function control of a hardware device) are received by the hardware device. The device control instructions are generated based on a positioning of a wearable hardware device of a user. In step 302, communications (e.g., wireless pairing communications) between the hardware device and the wearable hardware device are synchronized. In step 304, a position signal (indicating a current position of the wearable hardware device with respect to a body of the user such as a specified degree of rotation of the wearable device with respect to a forearm of the user) is received (by the hardware device) from the wearable hardware device. The current position may result from a sequence of differing degrees of rotation (in differing directions) of the wearable hardware device with respect to a forearm of the user. In step 310, a command associated with controlling a specified function of the device is determined based on the position signal. In step 312, the command is executed resulting in the specified function of the hardware device being modified. The modification may comprise, inter alia, disabling power of the hardware device, enabling power of the hardware device, disabling an audio signal of the hardware device, enabling an audio signal of the hardware device, reducing an audio signal level of the hardware device, increasing an audio signal level of the hardware device, enabling a vibration function of the hardware device, disabling a vibration function of the hardware device, enabling a running application of the hardware device, terminating a running application of the hardware device, disabling a recording function of the hardware device, enabling a display light function of the hardware device, disabling a display light function of the hardware device, requesting a password input to the hardware device, requesting a communication function between the hardware device and an additional device etc. In step 314, an additional position signal indicating a new current position of the wearable hardware device with respect to the body of said user is received from the wearable hardware device and a new command associated with controlling a new specified function of the hardware device is determined based on the additional position signal. In step 316, the new command is executed resulting in the new specified function of the device being modified. Alternatively or additionally, the original specified function may be modified again in response to the new command. Additionally, the algorithm of FIG. 3 may be enabled to control a functionality of the wearable device itself (e.g., communications, an audio volume level, backlight control, etc.).

Figure 4:
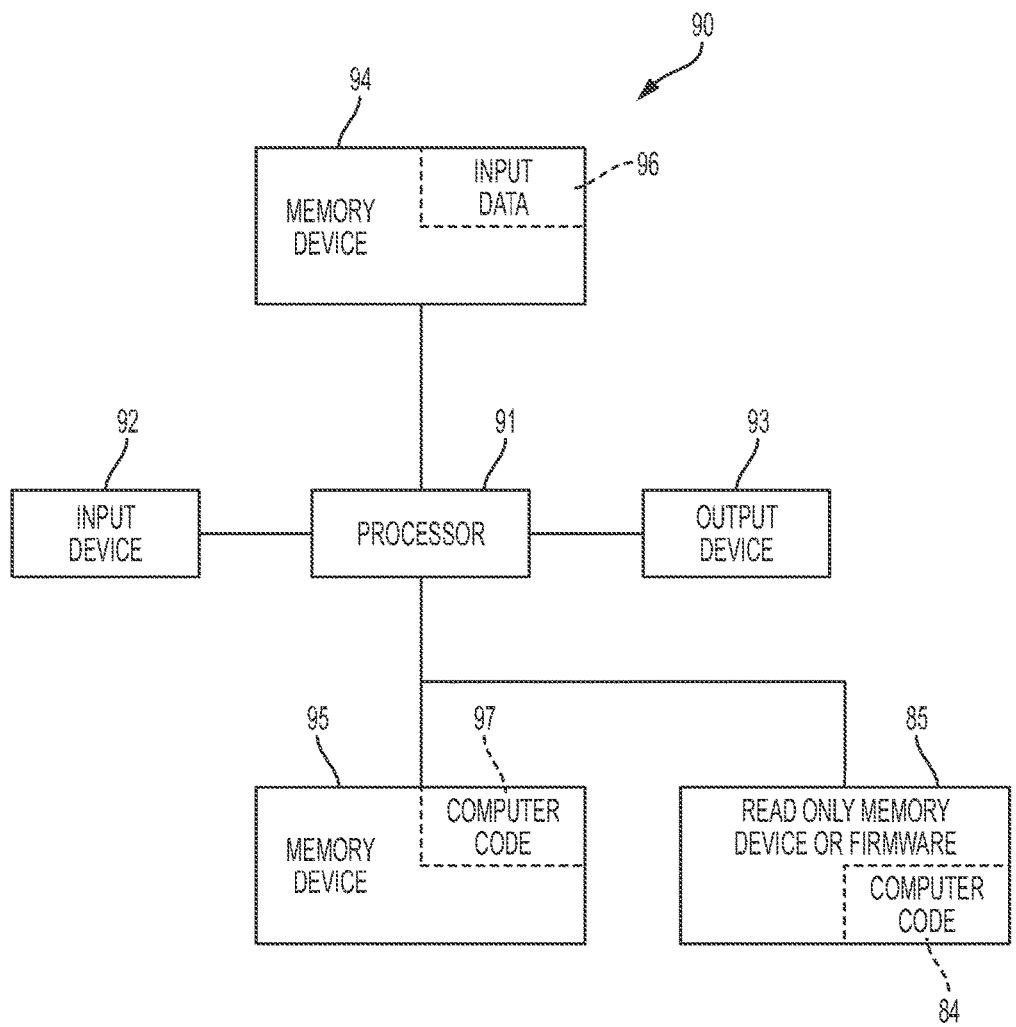
FIG. 4 illustrates a computer system used by the system of FIG. 1 for enabling a process for modifying functional control of a hardware device based on a positioning of a wearable device(s) of a user, in accordance with embodiments of the present invention.

FIG. 4 illustrates a computer system 90 (e.g., control hardware 119a and 119b internal to wearable devices 114a and 114b and hardware device 14) used by or comprised by the system of FIG. 1 for enabling a process for modifying functional control of a hardware device based on a positioning of a wearable device(s) of a user, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 4 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 3) for modifying functional control of a hardware device based on a positioning of a wearable device(s) of a user. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as read only memory device 96) may include algorithms (e.g., the algorithm of FIG. 3) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including the algorithm of FIG. 3) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to enable a process for modifying functional control of a hardware device based on a positioning of a wearable device(s) of a user. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for modifying functional control of a hardware device based on a positioning of a wearable device(s) of a user. In another embodiment, the invention provides a business method that performs the process steps of the invention on a subscription, advertising, and/or fee basis. That is, a service supplier, such as a Solution Integrator, could offer to enable a process for modifying functional control of a hardware device based on a positioning of a wearable device(s) of a user. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A positioning based control method comprising:
   receiving, by a processor of a device from a wearable hardware device of a user, a position signal indicating a current position of a display portion of said wearable hardware device with respect to a body of said user, wherein said current position results from performing a sequence of differing degrees of rotational movement of said display portion and a band portion of said wearable hardware device around an axis of a wrist of said user, wherein said differing degrees of rotational movement comprise specified degree rotation values comprising a 90 degree rotational movement value, a 180 degree rotational movement value, a 270 degree rotational movement value, and a 360 degree rotational movement value, and wherein said sequence comprises clockwise rotations followed by counter clockwise rotations comprising said differing degrees of rotational movement of said display portion and said band portion of said wearable hardware device around said axis of said wrist of said user; and executing, by said processor, a command determined based on said position signal resulting in a specified function of said device being modified.

2. The method of claim 1, wherein communications between said device and said wearable hardware device comprise wireless pairing communications.

3. The method of claim 1, wherein said current position additionally results from a specified degree of rotation of said wearable hardware device around said axis of said body portion of said user.

4. The method of claim 1, wherein said wearable hardware device comprises a sensor for monitoring positions of said wearable hardware device around said axis of said body portion of said user.

5. The method of claim 4, wherein said sensor is selected from the group consisting of an accelerometer, a humidity sensor, a pressure sensor, a proximity sensor, a temperature sensor, a heart rate monitor, an optical sensor, and a motion sensor.

6. The method of claim 1, wherein modifying said specified function of said device comprises a modification selected from the group consisting of disabling power of said device, enabling power of said device, disabling an audio signal of said device, enabling an audio signal of said device, reducing an audio signal level of said device, increasing an audio signal level of said device, enabling a vibration function of said device, disabling a vibration function of said device, enabling a running application of said device, terminating a running application of said device, enabling a recording function of said device, disabling a recording function of said device, enabling a display light function of said device, disabling a display light function of said device, requesting a password input to said device, and requesting a communication function between said device and an additional device.

7. The method of claim 1, further comprising:
receiving, by said processor from said wearable hardware device, an additional position signal indicating a new current position of said wearable hardware device with respect to an axis of a body portion of said user;
determining, by said processor based on said additional position signal, a new command associated with controlling a new specified function of said device; and
executing, by said processor, said new command resulting in said new specified function of said device being modified, wherein said new specified function differs from said specified function.

8. The method of claim 1, further comprising:
receiving, by said processor from said wearable hardware device, an additional position signal indicating a new current position of said wearable hardware device with respect to an axis of a body portion of said user;
determining, by said processor based on said additional position signal, a new command associated with additionally controlling said specified function of said device; and
executing, by said processor, said new command resulting in said specified function of said device being modified again.

9. The method of claim 1, further comprising:
providing at least one support service for at least one of creating, integrating, hosting, maintaining, and deploying computer-readable code in the control hardware, said code being executed by the computer processor to implement: said receiving said device control instructions, said receiving said position signal, and said executing.

10. A computer program product, comprising a computer readable hardware storage device storing a computer readable program code, said computer readable program code comprising an algorithm that when executed by a processor of a device of a user implements a positioning based control method, said method comprising:
receiving, by said processor from a wearable hardware device of said user, a position signal indicating a current position of a display portion of said wearable hardware device with respect to a body of said user, wherein said current position results from performing a sequence of differing degrees of rotational movement of said display portion and a band portion of said wearable hardware device around an axis of a wrist of said user, wherein said differing degrees of rotational movement comprise specified degree rotation values comprising a 90 degree rotational movement value, a 180 degree rotational movement value, a 270 degree rotational movement value, and a 360 degree rotational movement value, and wherein said sequence comprises clockwise rotations followed by counter clockwise rotations comprising said differing degrees of rotational movement of said display portion and said band portion of said wearable hardware device around said axis of said wrist of said user; and
executing, by said processor, a command determined based on said position signal resulting in a specified function of said device being modified.

11. The computer program product of claim 10, wherein communications between said device and said wearable hardware device comprise wireless pairing communications.

12. The computer program product of claim 10, wherein said current position additionally results from a specified degree of rotation of said wearable hardware device around said axis of said body portion of said user.

13. The computer program product of claim 10, wherein said wearable hardware device comprises a sensor for monitoring positions of said wearable hardware device around said axis of said body portion of said user.

14. The computer program product of claim 13, wherein said sensor is selected from the group consisting of an accelerometer, a humidity sensor, a pressure sensor, a proximity sensor, a temperature sensor, a heart rate monitor, an optical sensor, and a motion sensor.

15. The computer program product of claim 10, wherein modifying said specified function of said device comprises a modification selected from the group consisting of disabling power of said device, enabling power of said device, disabling an audio signal of said device, enabling an audio signal of said device, reducing an audio signal level of said device, increasing an audio signal level of said device, enabling a vibration function of said device, disabling a vibration function of said device, enabling a running application of said device, terminating a running application of said device, enabling a recording function of said device, disabling a recording function of said device, enabling a display light function of said device, disabling a display light function of said device, requesting a password input to said device, and requesting a communication function between said device and an additional device.

16. A device of a user comprising a processor coupled to a computer-readable memory unit, said memory unit comprising instructions that when executed by the processor implements a positioning based control method comprising:

receiving, by said processor from a wearable hardware device of said user, a position signal indicating a current position of a display portion of said wearable hardware device with respect to a body of said user, wherein said current position results from performing a sequence of differing degrees of rotational movement of said display portion and a band portion of said wearable hardware device around an axis of a wrist of said user, wherein said differing degrees of rotational movement comprise specified degree rotation values comprising a 90 degree rotational movement value, a 180 degree rotational movement value, a 270 degree rotational movement value, and a 360 degree rotational movement value, and wherein said sequence comprises clockwise rotations followed by counter clockwise rotations comprising said differing degrees of rotational movement of said display portion and said band portion of said wearable hardware device around said axis of said wrist of said user; and executing, by said processor, a command determined based on said position signal resulting in a specified function of said device being modified.

17. The device of claim 16, wherein communications between said device and said wearable hardware device comprise wireless pairing communications.

18. The device of claim 16, wherein said current position additionally results from a specified degree of rotation of said wearable hardware device around said axis of said body portion of said user.

19. The device of claim 16, wherein said wearable hardware device comprises a sensor for monitoring positions of said wearable hardware device around said axis of said body portion of said user.

20. The device of claim 19, wherein said sensor is selected from the group consisting of an accelerometer, a humidity sensor, a pressure sensor, a proximity sensor, a temperature sensor, a heart rate monitor, an optical sensor, and a motion sensor.

* * * * *